United States Patent
Araki et al.

(10) Patent No.: US 9,002,405 B2
(45) Date of Patent: Apr. 7, 2015

(54) DETERMINING ACCESS POINT BASE STATION

(75) Inventors: Toshihiro Araki, Tokyo (JP); Keiichi Kubota, Tokyo (JP)

(73) Assignee: NEC Corporation, Tokyo (JP)

(*) Notice: Subject to any disclaimer, the term of this patent is extended or adjusted under 35 U.S.C. 154(b) by 257 days.

(21) Appl. No.: 12/744,517

(22) PCT Filed: Dec. 12, 2008

(86) PCT No.: PCT/JP2008/072675
§ 371 (c)(1),
(2), (4) Date: Jul. 7, 2010

(87) PCT Pub. No.: WO2009/081772
PCT Pub. Date: Jul. 2, 2009

(65) Prior Publication Data
US 2010/0267404 A1    Oct. 21, 2010

(30) Foreign Application Priority Data

Dec. 25, 2007   (JP) .................................. 2007-331931

(51) Int. Cl.
*H04W 48/20*       (2009.01)
(52) U.S. Cl.
CPC ..................................... *H04W 48/20* (2013.01)
(58) Field of Classification Search
None
See application file for complete search history.

(56) References Cited

U.S. PATENT DOCUMENTS

2009/0275353 A1* 11/2009 Fujita et al. .................... 455/513
2010/0267404 A1* 10/2010 Araki et al. ..................... 455/500

FOREIGN PATENT DOCUMENTS

| EP | 1679921 A1 | 7/2006 |
|---|---|---|
| JP | 10-23503 A | 1/1998 |
| JP | 10-79969 A | 3/1998 |
| JP | 2006155560 A | 6/2006 |
| JP | 2007028234 A | 2/2007 |
| JP | 2007110373 A | 4/2007 |
| JP | 2007129604 A | 5/2007 |
| JP | 2007266988 A | 10/2007 |
| WO | 2005041609 A | 5/2005 |

OTHER PUBLICATIONS

International Search Report for PCT/JP2008/072675 mailed Mar. 17, 2009.
Japanese Office Action for JP2009-547037 issued Mar. 21, 2012.
Chinese Office Action for CN200880122840.8 dated on Jul. 4, 2012.

* cited by examiner

*Primary Examiner* — Philip Sobutak
(74) *Attorney, Agent, or Firm* — Sughrue Mion, PLLC

(57) ABSTRACT

When an access process request signal for access to a connection network, from a terminal which exists in the same coverage area shared by a plurality of radio base stations, is received by one of the radio base stations, an access point base station is determined according to the resource information of the radio base stations by the connection network so as to transmit to the terminal, an access process base station modification request signal which requests that the access process request signal be transmitted to the radio base station that serves as the determined access point base station.

8 Claims, 5 Drawing Sheets

| BASE STATION NUMBER | COVERAGE AREA | RESOURCE INFORMATION (USE RATIO) |
|---|---|---|
| 102-1 | X | 90% |
| 102-2 | X | 10% |
| 102-3 | Y | 50% |
| 102-4 | Y | 99% |
| . . . | . . . | . . . |

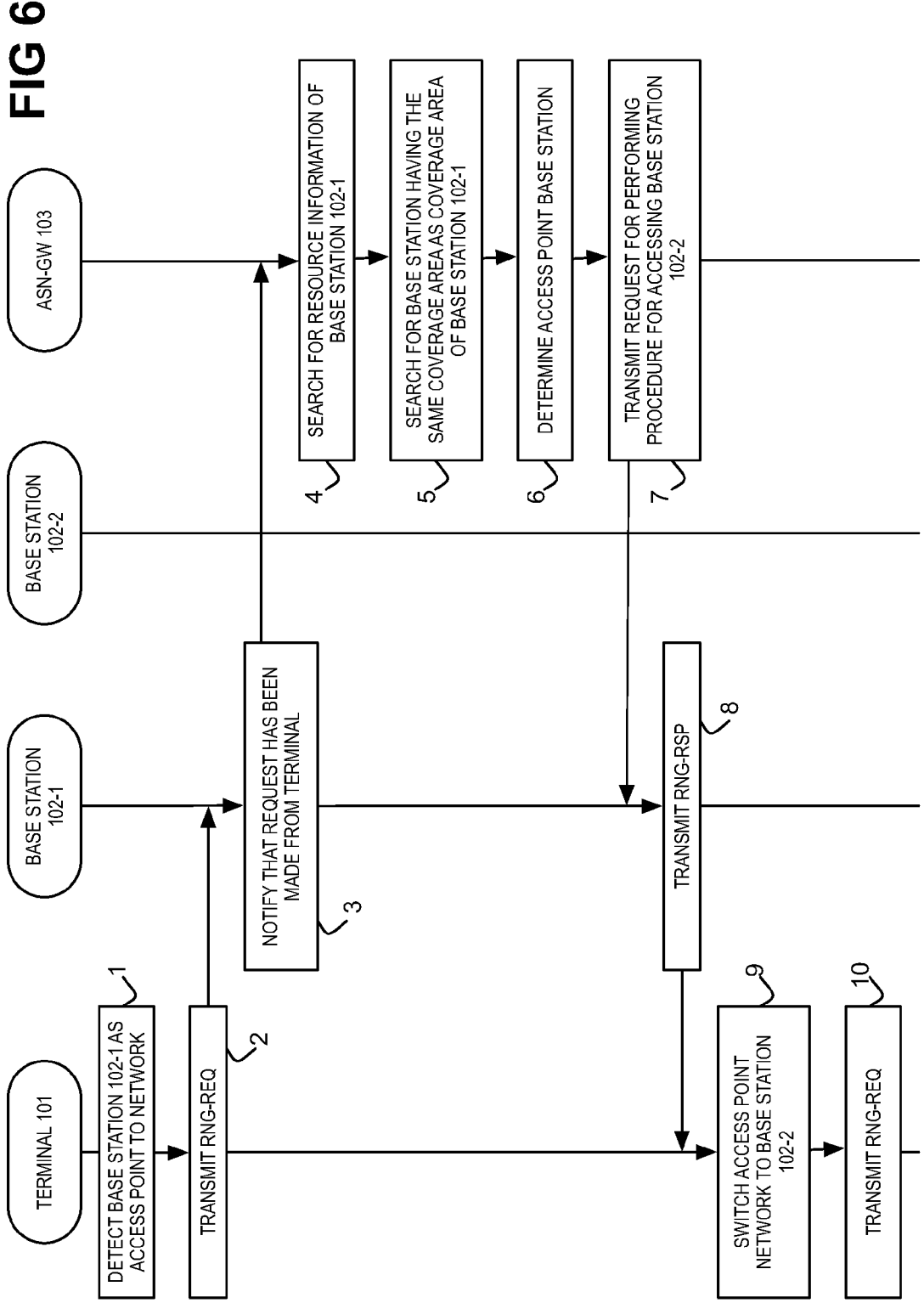

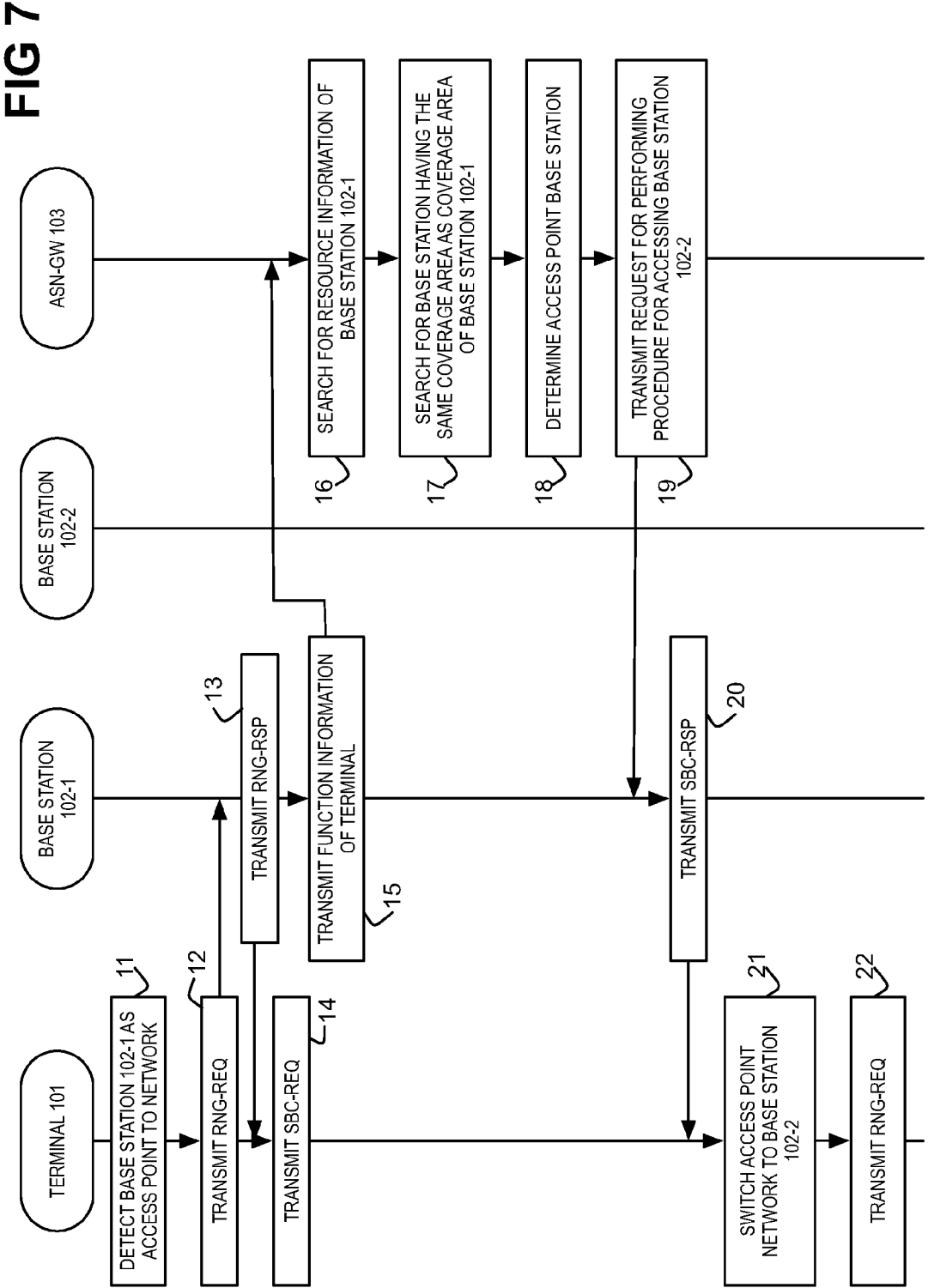

DETERMINING ACCESS POINT BASE STATION

This application is the National Phase of PCT/JP2008/072675, filed Dec. 12, 2008, which claims the priority based on Japanese Patent Application No. 2007-331931 filed Dec. 25, 2007, the disclosure of which is incorporated herein by reference in its entirety.

TECHNICAL FIELD

The present invention relates to a connection network and a radio communication control method for making radio communications, and more particularly, to a connection network and a radio communication control method which employ WiMAX technologies.

BACKGROUND ART

In recent years, WiMAX (Worldwide Interoperability for Microwave Access) has received attention as standard specifications for radio communication. WiMAX is standardized in IEEE802.16, IEEE802.16e, IEEE802.16 Corrigendum 2 and WiMAX Forum. In technologies which employ this standard, when a terminal such as SS (Subscribe Station) and MS (Mobile Station) accesses to a network, the terminal itself selects a base station (BS) to which it should connect, and then starts a network access procedure.

When a terminal attempts to connect to a base station, the connection of the terminal can be difficult depending on the radio resources of the base station. In this event, an access service network (ASN) has no ability to hand over the terminal to another base station during a network access procedure.

A technology has also been contemplated for notifying a terminal of a base station to which the terminal should connect, from a radio terminal connection device for controlling base stations, in accordance with a time zone in which the terminal connects to a base station, in order to avoid line shortage of a radio base station (see, For example, JP1998-23503A).

In the technologies described above, a network access procedure can fail due to the inabilities of the access service network (ASN) to hand over a pertinent terminal to another base station. Also, even if a base station exists with sufficient radio resources in the same coverage area as a pertinent base station, a problem arises in that the terminal cannot be guided to the base station which provides sufficient radio resources. Also, another problem arises in a situation where a plurality of base stations are installed to manage the same coverage area in which a hand-over procedure must be performed at the initiative of the base stations after completion of a network access procedure for each terminal, to hand over such terminals to respective base stations, in order to distribute terminals, which are gaining access to a network one after another, to respective base stations.

Also, in the technology disclosed in JP1998-23503A, since the connection of a terminal with a base station is managed in regard to time zones, it is necessary to previously set a time zone in which the terminal can connect to a predetermined base station, giving rise to a problem in which a considerable effort is required to complete the setup.

DISCLOSURE OF THE INVENTION

It is an object of the present invention to provide a connection network and a radio communication control method which solve the aforementioned problems.

To achieve the above object, the present invention provides a connection network comprising a plurality of radio base stations having the same coverage area as one another, and a radio base station control device for controlling the plurality of radio base stations, wherein:

the access point base station is determined from among the plurality of radio base stations based on resource information of the plurality of radio base stations when an access procedure request signal for accessing the connection network is received at one of the plurality of radio base stations from a terminal which exists within the coverage area, and an access procedure base station change request signal is transmitted to the terminal for requesting the terminal to transmit the access procedure request signal to the radio base station which has been determined to be an access point base station for which the terminal performs an access procedure when a radio base station determined to be the access point base station is not a radio base station which has received the access procedure request signal from the terminal.

The present invention also provides a radio communication control method in a connection network comprising a plurality of radio base stations having the same coverage area as one another, and a radio base station control device for controlling the plurality of radio base stations. The method comprises the processing of:

determining the access point base station from among the plurality of radio base stations based on resource information of the plurality of radio base stations when an access procedure request signal for accessing the connection network is received at one of the plurality of radio base stations from a terminal which exists in the coverage area; and transmitting an access procedure base station change request signal to the terminal for requesting the terminal to transmit the access procedure request signal to the radio base station which has been determined to be an access point base station for which the terminal performs an access procedure, when a radio base station determined to be the access point base station is not a radio base station which has received the access procedure request signal from the terminal.

As described above, in the present invention, when an access procedure request signal for accessing a connection network is received at a radio base station from a terminal which exists in the same coverage area mutually defined by a plurality of radio base stations, an access point base station is determined on the basis of resource information of the plurality of radio base stations. Then, an access procedure base station change request signal is transmitted to the terminal for requesting the same to transmit an access procedure request signal to a radio base station which serves as the determined access point base station. It is therefore possible to readily reduce the probability that the terminal fails in a network access procedure.

BRIEF DESCRIPTION OF THE DRAWINGS

FIG. 6 A sequence diagram for describing the radio communication control method in this embodiment.

FIG. 7 A sequence diagram for describing another example of the radio communication control method in this embodiment.

BEST MODE FOR CARRYING OUT THE INVENTION

In the following, one embodiment of the present invention will be described with reference to the drawings.

Figure 1:
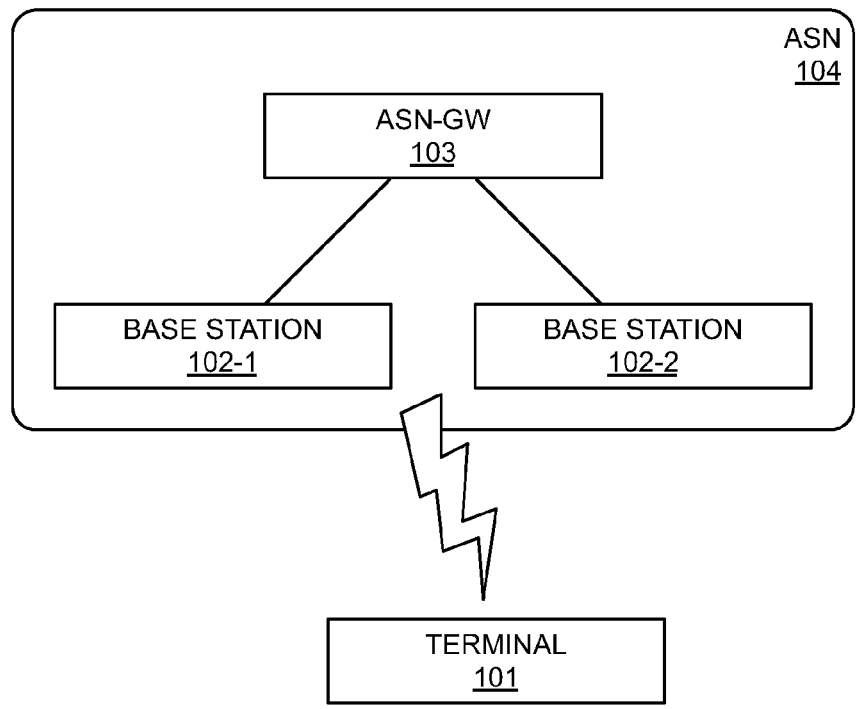
FIG. 1 A diagram showing one embodiment of a radio communication system according to the present invention.

FIG. 1 is a diagram showing one embodiment of a radio communication system according to the present invention. Here, the system comprises a network which employs the WiMAX standard.

As shown in FIG. 1, this embodiment comprises terminal 101, base stations 102-1, 102-2, and ASW-GW 103. Also, ASN 104 is made up of ASN-GW 103 and base stations 102-1, 102-2.

Terminal 101 is a mobile terminal having a radio communication function.

Base stations 102-1, 102-2 are radio base stations which have a predetermined coverage area, and can connect to a terminal which exists in the coverage area.

ASW-GW 103 is a radio base station control device which is connected to base stations 102-1, 102-2 for controlling base stations 102-1, 102-2. ASW-GW 103 given herein as an example is a connection service network gateway in ASN 104.

ASN 104 is a WiMAX access service network for providing WiMAX access services.

Figure 2:
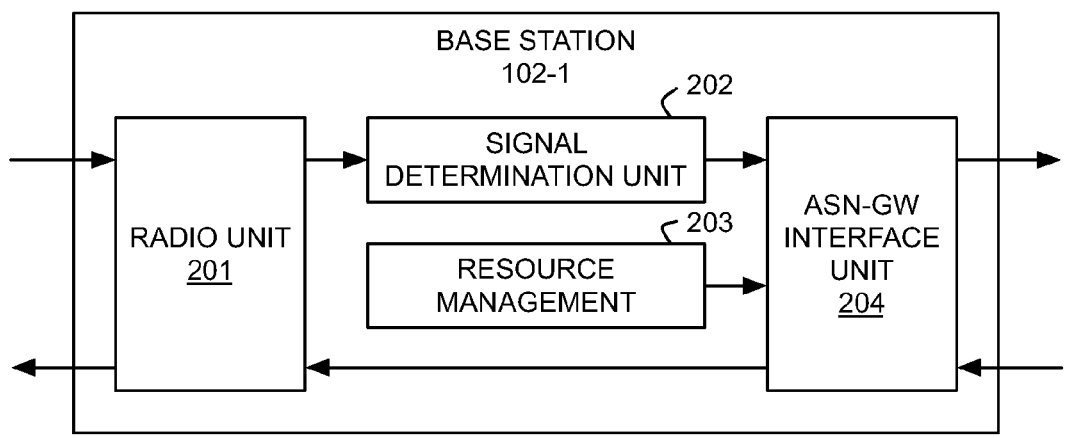
FIG. 2 A diagram showing an exemplary internal configuration of a base station shown in FIG. 1.

FIG. 2 is a diagram showing an exemplary internal configuration of base station 102-1 shown in FIG. 1.

As shown in FIG. 2, base station 102-1 shown in FIG. 1 has radio unit 201, signal determination unit 202, resource management unit 203, and ASN-GW interface unit 204. Notably, FIG. 2 shows only those components which relate to the present invention, among components contained in base station 102-1. Also, the internal configuration of base station 102-2 shown in FIG. 1 is the same as the internal configuration of base station 102-1 shown in FIG. 2.

Radio unit 201 transmits/receives a radio signal to/from terminal 101. Radio unit 201 has a general antenna and a modulation/demodulation function.

Signal determination unit 202 determines whether or not a signal transmitted from terminal 101 is an access procedure request signal indicative of an access procedure request. Signal determination unit 202 also determines whether or not a signal transmitted from terminal 101 includes function information indicating available functions of terminal 101.

Resource management unit 203 manages radio resources (radio resources) of base station 102-1. For example, resource management unit 203 may manage the proportion of currently used radio resources to radio resources available in base station 102-1 (use ratio). Information on radio resources managed by resource management unit 203 is transmitted to ASN-GW 103 at all times.

ASN-GW interface unit 204 transmits/receives a signal to/from ASN-GW 103.

Figures 3, 4:
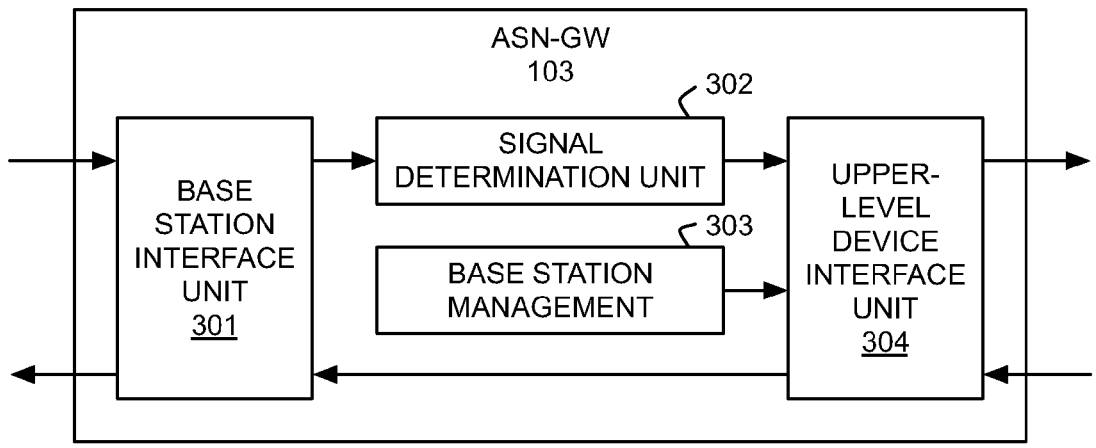
FIG. 3 A diagram showing an exemplary internal configuration of ASN-GW shown in FIG. 1.
FIG. 4 A diagram showing exemplary base station information stored in a base station management unit shown in FIG. 3.

FIG. 3 is a diagram showing an exemplary internal configuration of ASN-GW 103 shown in FIG. 1.

As shown in FIG. 3, ASN-GW 103 shown in FIG. 1 has base station interface unit 301, signal determination unit 302, base station management unit 303, and higher-level device interface unit 304. Notably, FIG. 3 shows only those components which relate to the present invention among components contained in ASN-GW 103.

Base station interface 301 transmits/receives a signal to/from base stations 102-1, 102-2.

Signal determination unit 302 determines whether or not a signal transmitted from base station 102-1, 102-2 is an access procedure request signal indicative of an access procedure request from terminal 101. Signal determination unit 302 also determines whether or not a signal transmitted from base station 102-1, 102-2 is function information indicating available functions of terminal 101.

Base station management unit 303 stores base station information of base stations 102-1, 102-2 connected to ASN-GW 103, and manages base stations 102-1, 102-2 based on the stored base station information.

Higher-level device interface unit 304 transmits/receives a signal to/from a device connected at a higher level to ASN-GW 103.

FIG. 4 is a diagram showing exemplary base station information stored in base station management unit 303 shown in FIG. 3.

As shown in FIG. 4, base station management unit 303 shown in FIG. 3 stores base station numbers uniquely assigned to respective base stations, coverage areas of the respective base stations, and resource information which is information indicating radio resources of the respective base stations, all of which are corresponded to one another, as base station information. While the resource information given herein as an example is represented by the proportion of currently used radio resources to available radio resources (use ratio), the resource information may simply present the amount of radio resources available for a base station. This resource information is transmitted from the respective base stations and updated at all times. For example, base station management unit 303 stores base station information for base station 102-1 which contains a coverage area "X" and resource information indicative of 90%. Base station management unit 303 also stores base station information for base station 102-2 which contains a coverage area "X" and resource information indicative of 10%. Base station management unit 303 further stores base station information for base station 102-3 which contains a coverage area "Y" and resource information indicative of 50%. Base station management unit 303 also stores base station information for base station 102-4 which contains a coverage area "Y" and resource information indicative of 99%.

The following description will be given of a radio communication control method in this embodiment.

Figure 5:
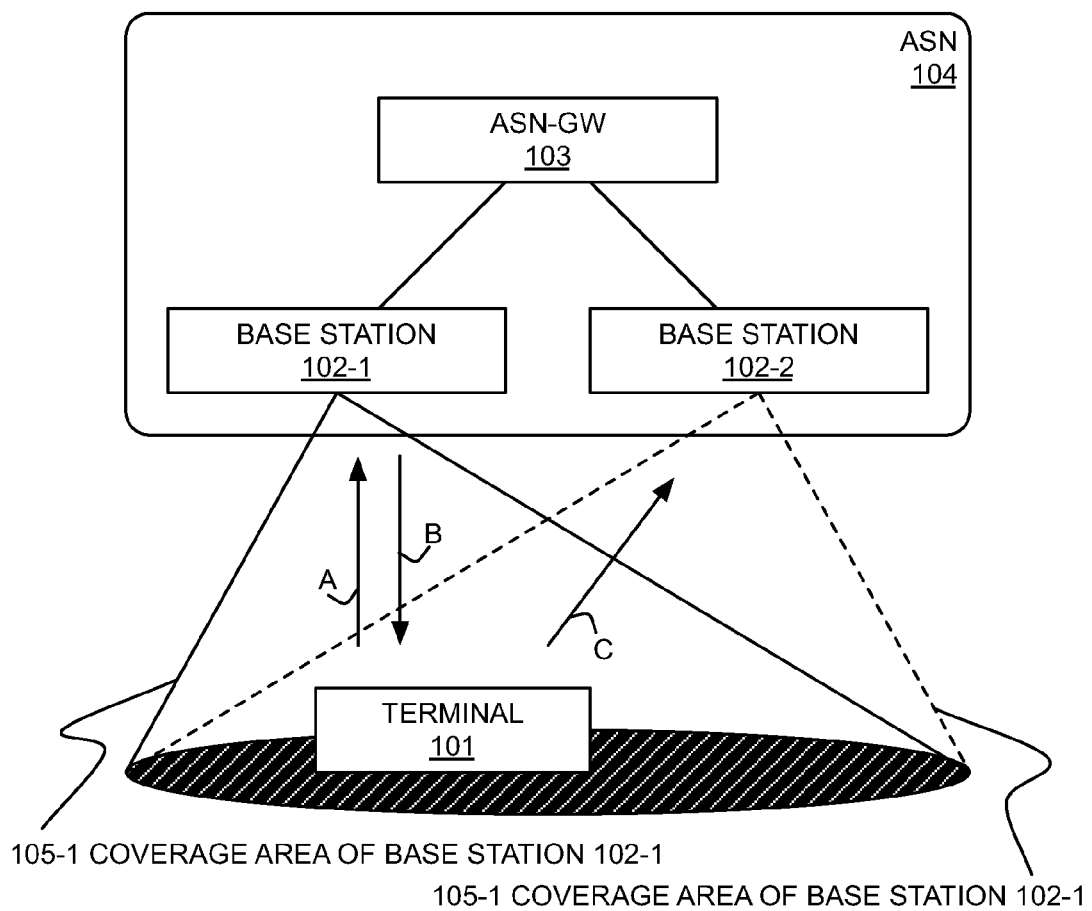
FIG. 5 A conceptual diagram for describing a radio communication control method in this embodiment.

FIG. 5 is a conceptual diagram for describing the radio communication control method in this embodiment. FIG. 6 in turn is a sequence diagram for describing the radio communication control method in this embodiment. Here, a description will be given with reference to an exemplary scenario, as shown in FIG. 5, where coverage area 105-1 of base station 102-1 is the same as coverage area 105-2 of base station 102-2, and terminal 101 exists in this coverage area, and first detects base station 102-1 as an access point to ASN 104.

When base station 102-1 is detected at terminal 101 as an access point to ASN 104 at step 1, an access procedure request signal indicative of an access procedure request is transmitted from terminal 101 to base station 102-1 using an RNG-REQ signal to make a ranging request at step 2, as indicated by arrow A in FIG. 5.

Upon receipt of the RNG-REQ signal transmitted from terminal 101 at radio unit 201 of base station 102-1, signal determination unit 202 determines whether or not the received signal is an access procedure request signal.

When it is determined that the received signal is an access procedure request signal, ASN-GW interface unit 204 notifies ASN-GW 103 of the request for an access procedure made from terminal 101 at step 3. A signal used for this notification, i.e., a signal for notification transmitted from base station 102-1, only needs to allow a base station to recognize that a request for an access procedure has been made from terminal 101, and the signal is not defined herein with respect to its format.

Upon receipt of the signal indicative of the request for an access procedure made from terminal 101, transmitted from ASN-GW interface unit 204 of base station 102-1, at base station interface unit 301 of ASN-GW 103, signal determination unit 302 determines whether or not the received signal is a signal indicative of a request which has been made for an access procedure.

When it is determined in signal determination unit 302 that the signal indicates that a request has been made for an access procedure, a search is conducted for resource information of base station 102-1 in base station management unit 303 at step 4.

Also, a search is conducted for a base station that has the same coverage area as base station 102-1 in base station management unit 303 at step 5. Here, base station 102-2 is retrieved.

When the resource information of base station 102-1, and base station 102-2 having the same coverage area as base station 102-1 has been retrieved from base station management unit 303, an access point base station, which is a base station to be accessed by terminal 101, is determined on the basis of them at step 6. A method for this determination may be such that when the resource information of base station 102-1 is larger than the resource information of base station 102-2, base station 102-2 is determined as an access point base station for terminal 101. In other words, either base station 102-1 or base station 102-2 which currently provides more free radio resources may be determined as an access point base station. Alternatively, when the resource information of base station 102-1 presents a larger value than a previously set threshold value, and when the resource information of base station 102-2 presents a smaller value than the threshold value, base station 102-2 may be determined as an access point base station for terminal 101. Stated another way, the determination may be made depending on whether terminal 101 should be allowed to access point base station 102-1 or base station 102-2 for higher utilization efficiency of radio resources. Likewise, when there are even three or more base stations which have the same coverage area, the one which currently provides the most free radio resources, for example, may be determined as an access point. It is determined herein that a higher utilization efficiency is provided for radio resources when terminal 101 is allowed to access base station 102-2. Then, at step 7, a signal for requesting terminal 101 to perform an access procedure to access base station 102-2, i.e., to transmit an access procedure request signal to base station 102-2, is transmitted from base station interface unit 301 of ASN-GW 103 to base station 102-1. The signal is not either defined herein for its format.

Upon receipt of the signal transmitted from base station interface unit 301 of ASN-GW 103 at ASN-GW interface unit 204 of base station 102-1, an access procedure base station change request signal is transmitted from radio unit 201 of base station 102-1 to terminal 101, for indicating a request for a change of a base station to which an access procedure is performed, using an RNG-RSP signal at step 8, as indicated by arrow B in FIG. 5.

Upon receipt of the access procedure base station change request signal transmitted from base station 102-1 at terminal 101, an access point is switched to base station 102-2 in terminal 101 at step 9.

Then, an access procedure request signal indicative of an access procedure request is transmitted from terminal 101 to base station 102-2 using an RNG-REQ signal at step 10, as indicated by arrow C in FIG. 5.

Alternatively, instead of using the RNG-REQ signal as mentioned above, SBC-REQ may be used.

FIG. 7 is a sequence diagram for describing another example of the radio communication control method in this embodiment. Here, similar to the method described with reference to the sequence diagram of FIG. 6, a description will be given with reference to an exemplary scenario, as shown in FIG. 5, where coverage area 105-1 of base station 102-1 is the same as coverage area 105-2 of base station 102-2, and terminal 101 exists in this coverage area, and first detects base station 102-1 as an access point to ASN 104.

When base station 102-1 is detected at terminal 101 as an access point to ASN 104 at step 11, access procedure request signal indicative of an access procedure request is transmitted from terminal 101 to base station 102-1 using an RNG-REQ signal to make a ranging request at step 12, as indicated by arrow A in FIG. 5.

Upon receipt of the RNG-REQ signal transmitted from terminal 101 at radio unit 201 of base station 102-1, an RNG-RSP signal corresponding to the received RNG-REG signal is transmitted from radio unit 201 to terminal 101 at step 13.

Upon receipt of the RNG-RSP signal transmitted from radio unit 201 of base station 102-1 at terminal 101, function information indicative of available functions of terminal 101 is transmitted from terminal 101 to base station 102-1 using an SBC-REQ signal at step 14.

Upon receipt of the SBC-REQ signal transmitted from terminal 101 at radio unit 201 of base station 102-1, it is determined in signal determination unit 202 whether or not the received signal is an SBC-REQ signal.

When it is determined that the received signal is an SBC-REQ signal, the function information of terminal 101 is extracted in signal determination unit 202, and the extracted function information is transmitted from ASN-GW interface unit 204 to ASN-GW 103 at step 15. The function information transmitted from base station 102-1 needs only to allow a base station to recognize available functions of terminal 101, and is not defined herein with respect to its signal format.

Upon receipt of the function information transmitted from ASN-GW interface unit 204 of base station 102-1 at base station interface unit 301 of ASN-GW 103, it is determined in signal determination unit 302 whether or not the received signal is the function information.

When it is determined in signal determination unit 302 that the received signal is the function information, a search is conducted for resource information of base station 102-1 in base station management unit 303 at step 16.

Also, a search is conducted for a base station that has the same coverage area as base station 102-1 in base station management unit 303 at step 17. Here, base station 102-2 is retrieved.

When the resource information of base station 102-1 and base station 102-2 having the same coverage area as base station 102-1 have been retrieved from base station management unit 303, an access point base station is determined at step 18 as a base station which terminal 101 is to access, based on the retrieved resource information and base station 102-2 and function information of terminal 101. A method for this determination may be such that when available functions of terminal 101 consume many radio resources, for example, either base station 102-1 or base station 102-2 which currently provides more free radio resources is determined as an access point base station. Alternatively, when available functions of terminal 101 consume radio resources less than a previously set threshold value, one may be arbitrarily selected from base station 102-1 and base station 102-2 as long as these base stations provide a sufficient amount of free radio resources for use by the available functions. Further, for example, base station 102-1 may be selected as an access point for terminal 101 which has available functions that consume radio resources less than a previously set threshold value, while base station 102-2 may be selected as an access point for terminal 101 which has available functions that consume radio resources more than the previously set threshold value. In this way, the determination may be made in accordance with whether terminal 101 should be allowed to access base station 102-1 or base station 102-2 for higher utilization efficiency of radio resources. Likewise, when there are even three or more base stations which have the same coverage area, the one which currently provides the most free radio resources, for example, may be determined as an access point. It is determined herein that a higher utilization efficiency is provided for radio resources when terminal 101 is allowed to access base station 102-2. Then, at step 19, a signal for requesting terminal 101 to perform an access procedure to access base station 102-2, i.e., to transmit an access procedure request signal to base station 102-2, is transmitted from base station interface unit 301 of ASN-GW 103 to base station 102-1. The signal is not either defined herein with respect to its format.

Upon receipt of the signal transmitted from base station interface unit 301 of ASN-GW 103 at ASN-GW interface unit 204 of base station 102-1, an access procedure base station change request signal is transmitted from radio unit 201 of base station 102-1 to terminal 101, for indicating a request for a change of a base station to which an access procedure is performed, using an SBC-RSP signal at step 20, as indicated by arrow B in FIG. 5.

Upon receipt of the access procedure base station change request signal transmitted from base station 102-1 at terminal 101, an access point is switched to base station 102-2 in terminal 101 at step 21.

Then, an access procedure request signal indicative of an access procedure request is transmitted from terminal 101 to base station 102-2 using an RNG-REQ signal at step 22, as indicated by arrow C in FIG. 5.

In this way, an appropriate base station can be selected in accordance with the capabilities (available functions) of terminal 101 by requesting an access procedure request at a different base station using the SBC-RSP signal instead of the RNG-RSP signal. Advantageously, the determination can be made in greater detail than when the RNG-RSP signal is used.

Alternatively, processing at the aforementioned steps 3, 7, 15 and step 19 may be omitted, and processing at steps 4-6 and steps 16-18 may be performed in base station 102-1. In other words, processing for determining an access point base station may be performed in base station 102-1. In this event, base stations 102-1, 102-2 may mutually collect base station information shown in FIG. 4 and determine an access point base station based on the base station information. Base stations 102-1, 102-2 may have an interface unit for collecting base station information of base stations adjacent to one another, and mutually collect their base station information using the interface unit. Notably, they may be performed in a similar manner between sectors within one base station.

As described above, the present invention provides advantages as described below.

As a first advantage, since a terminal can be prompted to transfer to another appropriate base station, it is possible to reduce the probability of failure in the access procedure of the terminal.

Also, as a second advantage, in a scenario where the same coverage area is managed by a plurality of base stations, a function can be implemented to distribute terminals to respective base stations at a stage when the network access procedure is performed. In this way, radio resource management can be implemented for distributing loads among base stations, and allowing terminals to intensively access a particular base station.

Further, as a third advantage, for handing over a terminal to a different base station using general technologies, the terminal must be handed over in a base station driven hand-over procedure, as described in IEEE802.16, IEEE802.16e, IEEE802.16, Corrigendum 2, and WiMAX Forum, after the completion of a network access procedure for the terminal. The present invention enables a terminal to be handed over to another base station at a stage when the network access procedure is performed, thus reducing the load on the access service network for terminal hand-over processing.

For reference, the aforementioned RNG-REQ/RSP and SBC-REQ/RSP signals are signals defined in IEEE802.16/IEEE802.16e/IEEE802.16 Corrigendum 2.

While the present invention has been described with reference to some embodiments, the present invention is not limited to the embodiments described above. The present invention can be modified in configuration and details in various manners which can be understood by those skilled in the art within the scope of the present invention.

The invention claimed is:

1. A network comprising a plurality of radio base stations having an overlapping coverage area one another, and a radio base station control device for controlling said plurality of radio base stations, wherein:

an access point base station is determined from among said plurality of radio base stations based on resource information of said plurality of radio base stations when an access procedure request signal for accessing said network is received at one of said plurality of radio base stations from a terminal which exists within the overlapping coverage area, and an access procedure base station change request signal is transmitted to said terminal for requesting said terminal to transmit the access procedure request signal to said radio base station which has been determined to be an access point base station for which said terminal performs an access procedure when a radio base station that is determined to be the access point base station is not a radio base station which has received the access procedure request signal from said terminal, wherein the terminal performs data communication with the determined access point base station after transmitting the access procedure request signal, said network is an ASN (Access Service Network) on WiMAX (Worldwide Interoperability for Microwave Access), upon receipt of function information indicative of available functions of said terminal from said terminal, determining said access point base station based on the function information and the resource information, and enabling information on the access procedure base station change request to be set in an SBC-RSP signal, and transmitting the access procedure base station change request to said terminal using the SBC-RSP signal.

2. The connection network according to claim 1, characterized by:
  determining a radio base station which provides the most radio resources are free in the resource information to be said access point base station.

3. The connection network according to claim 1, characterized by:
  enabling information on the access procedure base station change request to be set in an RNG-RSP signal, and transmitting the access procedure base station change request to said terminal using the RNG-RSP signal.

4. A radio communication control method in a network comprising a plurality of radio base stations having an overlapping coverage area one another, and a radio base station control device for controlling said plurality of radio base stations, said method comprising the processing of:
  determining an access point base station from among said plurality of radio base stations based on resource information of said plurality of radio base stations when an access procedure request signal for accessing said connection network is received at one of said plurality of radio base stations from a terminal which exists in the coverage area; and
  transmitting an access procedure base station change request signal to said terminal for requesting said terminal to transmit the access procedure request signal to said radio base station which has been determined to be an access point base station for which said terminal performs an access procedure, when a radio base station that is determined to be the access point base station is not a radio base station which has received the access procedure request signal from said terminal,
  wherein the terminal performs data communication with the determined access point base station after transmitting the access procedure request signal,
  said network is an ASN (Access Service Network) on WiMAX (Worldwide Interoperability for Microwave Access),
  upon receipt of function information indicative of available functions of said terminal from said terminal, determining said access point base station based on the function information and the resource information, and
  enabling information on the access procedure base station change request to be set in an SBC-RSP signal, and transmitting the access procedure base station change request to said terminal using the SBC-RSP signal.

5. The radio communication control method according to claim 4, characterized by comprising the processing of:
  upon receipt of function information indicative of available functions of said terminal from said terminal, determining said access point base station based on the function information and the resource information.

6. The radio communication control method according to claim 4, characterized by comprising the processing of:
  determining the radio base station which provides the most radio resources are free in the resource information to be said access point base station.

7. A mobile terminal for a network comprising a plurality of radio base stations having an overlapping coverage area one another, the mobile terminal being configured to:
  transmit, to a radio base station from among said plurality of radio base stations, an access procedure request signal for accessing said network when the mobile terminal exists within the overlapping coverage area;
  receive an access procedure base station change request signal which enables the mobile terminal to transmit the access procedure request signal to said radio base station which has been determined to be an access point base station for which the mobile terminal performs an access procedure when a radio base station that is determined to be the access point base station is not a radio base station which has received the access procedure request signal from said mobile terminal; and
  perform data communication with the determined access point base station after transmitting the access procedure request signal,
  said network is an ASN (Access Service Network) on WiMAX (Worldwide Interoperability for Microwave Access),
  upon receipt of function information indicative of available functions of said terminal from said terminal, determining said access point base station based on the function information and the resource information, and
  enabling information on the access procedure base station change request to be set in an SBC-RSP signal, and transmitting the access procedure base station change request to said terminal using the SBC-RSP signal.

8. A radio base station control device for a network comprising a network comprising a plurality of radio base stations having an overlapping coverage area one another, the radio base station control device comprising:
  an interface being configured to:
  receive, from a radio base station from among the plurality of radio base stations, an access procedure request signal for accessing a network when a mobile terminal exists within the overlapping coverage area; and
  transmit an access procedure base station change request signal which enables the mobile terminal to transmit the access procedure request signal to said radio base station which has been determined to be an access point base station for which said mobile terminal performs and access procedure when a radio base station that is determined to be the access point base station is not a radio base station which has received the access procedure request signal from said mobile terminal,
  wherein data communication between the mobile station and the determined access point base station is performed after transmitting the access procedure request signal,
  said network is an ASN (Access Service Network) on WiMAX (Worldwide Interoperability for Microwave Access),
  upon receipt of function information indicative of available functions of said terminal from said terminal, determining said access point base station based on the function information and the resource information, and
  enabling information on the access procedure base station change request to be set in an SBC-RSP signal, and transmitting the access procedure base station change request to said terminal using the SBC-RSP signal.

* * * * *